United States Patent
Zhang et al.

(10) Patent No.: US 12,520,314 B2
(45) Date of Patent: Jan. 6, 2026

(54) METHOD AND APPARATUS FOR PHYSICAL DOWNLINK SHARED CHANNEL SCHEDULING DELAY COUNTING

(71) Applicant: Telefonaktiebolaget LM Ericsson (PUBL), Stockholm (SE)

(72) Inventors: Liping Zhang, Beijing (CN); Gerardo Agni Medina Acosta, Märsta (SE); Ola Lundqvist, Karlstad (SE); Jie Chen, Beijing (CN); Johan Bergman, Stockholm (SE); Kazuyoshi Uesaka, Kawasaki Kanagawa (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 332 days.

(21) Appl. No.: 18/007,186

(22) PCT Filed: Jul. 30, 2021

(86) PCT No.: PCT/IB2021/057008
§ 371 (c)(1),
(2) Date: Jan. 27, 2023

(87) PCT Pub. No.: WO2022/024089
PCT Pub. Date: Feb. 3, 2022

(65) Prior Publication Data
US 2023/0239873 A1  Jul. 27, 2023

(51) Int. Cl.
*H04W 72/1273* (2023.01)
*H04L 1/1812* (2023.01)
*H04W 72/23* (2023.01)

(52) U.S. Cl.
CPC ....... *H04W 72/1273* (2013.01); *H04L 1/1812* (2013.01); *H04W 72/23* (2023.01)

(58) Field of Classification Search
CPC .. H04L 1/1812; H04W 72/23; H04W 72/1273
(Continued)

(56) References Cited

U.S. PATENT DOCUMENTS 11,147,073 B2 * 10/2021 Liou .................. H04L 5/0098
2020/0044792 A1 * 2/2020 Vaidya .................. H04L 47/34
(Continued)

FOREIGN PATENT DOCUMENTS

| CN | 106506123 A | 3/2017 |
|---|---|---|
| CN | 107371265 A | 11/2017 |

(Continued)

OTHER PUBLICATIONS

3GPP TSG RAN WG1 Meeting #99, Reno, USA, Nov. 18-22, 2019; Source: CATT; Title: Power saving scheme with cross-slot scheduling (R1-1912180).
PCT International Search Report issued for International application No. PCT/IB2021/057008—Nov. 4, 2021.
PCT Written Opinion of the International Searching Authority issued for International application No. PCT/IB2021/057008—Nov. 4, 2021.
(Continued)

*Primary Examiner* — Peter G Solinsky
(74) *Attorney, Agent, or Firm* — Baker Botts L.L.P.

(57) ABSTRACT

A method implemented by a user equipment (UE) in a communication network is provided. The method includes receiving, from a network node, a delay indicator that indicates a scheduling delay for Physical Downlink Shaved Channel, PDSCH, and the UE counts the scheduling delay for the PDSCH according to the received indicator.

21 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0007088 | A1* | 1/2021 | Zhou | H04W 72/23 |
| 2021/0083803 | A1* | 3/2021 | Sheng | H03M 13/2707 |
| 2022/0141888 | A1* | 5/2022 | He | H04W 74/0841 |
| | | | | 370/329 |
| 2022/0159568 | A1* | 5/2022 | Kim | H04W 52/0212 |
| 2023/0105751 | A1* | 4/2023 | Lee | H04W 76/14 |
| | | | | 370/329 |
| 2023/0209464 | A1* | 6/2023 | Tsai | H04W 52/0216 |
| | | | | 370/311 |

FOREIGN PATENT DOCUMENTS

| | | | |
|---|---|---|---|
| CN | 107911869 A | 4/2018 | |
| CN | 111201747 A | 5/2020 | |
| WO | WO2018064583 A1 | 4/2018 | |
| WO | WO-2021090298 A1 * | 5/2021 | ........... H04L 1/1812 |

OTHER PUBLICATIONS

3GPP TSG RAN Meeting #86, Sitges, Spain, Dec. 9-12, 2019; Source: Huawei, HiSilicon; Title: New WID on Rel-17 enhancements for NB-IoT and LTE-MTC; Document for: Approval; Agenda Item: 10.1.1 (RP-193264).

3GPP TSG RAN WG1 #99; Reno, USA, Nov. 18-22, 2019; Agenda item: 6.2.5; Source: Qualcomm Incorporated, Orange, Sierra Wireless, Verizon, Ericsson, Sequans, Nokia, Nokia Shanghai Bell; Title: Increased peak data rate for HD-FDD MTC UEs (R1-1912694).

3GPP TS 36.212 V16.1.0 (Mar. 2020); 3rd Generation Partnership Project; Technical Specification Group Radio Access Network; Evolved Universal Terrestrial Radio Access (E-UTRA); Multiplexing and channel coding (Release 16).

3GPP TS 36.133 V16.4.0 (Dec. 2019); 3rd Generation Partnership Project; Technical Specification Group Radio Access Network; Evolved Universal Terrestrial Radio Access (E-UTRA); Requirements for support of radio resource management (Release 16) [due to size, this reference has been split into two parts].

China Patent Office Official Action with Search Report in CN Application No. 202180067585.7, dated May 22, 2025 (with machine translation).

* cited by examiner

Table 1A

| Subframe # | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| MPDCCH | 0 | 1 | 2 | 3 | 4 | 5 | 6 | 7 | 8 | 9 | | | | | | | |
| PDSCH | | | 0 | 1 | 2 | 3 | 4 | 5 | 6 | 7 | 8 | 9 | | | | | |
| PUCCH (ACK) | | | | | | | | | | | | | | 0 | 1 | 2 | |

Table 1B

| Subframe # | 17 | 18 | 19 | 20 | 21 | 22 | 23 | 24 | 25 | 26 | 27 | 28 |
|---|---|---|---|---|---|---|---|---|---|---|---|---|
| MPDCCH | 0 | 1 | 2 | 3 | 4 | 5 | 6 | 7 | 8 | 9 | | |
| PDSCH | | | 0 | 1 | 2 | 3 | 4 | 5 | 6 | 7 | 8 | 9 |
| PUCCH (ACK) | | | | | | | | | | | | |

Fig. 6

Table 2A

| Subframe # | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| MPDCCH | 0 | 1 | 2 | 3 | 4 | 5 | 6 | 7 | 8 | 9 | 10 | 11 | | | | | |
| PDSCH | 0 | 1 | 2 | 3 | 4 | 5 | 6 | 7 | 8 | 9 | | | | | | | |
| PUCCH (ACK) | | | | | | | | | | | | | 0 | 1 | 2 | | |

Table 2B

| Subframe # | 17 | 18 | 19 | 20 | 21 | 22 | 23 | 24 | 25 | 26 | 27 | 28 |
|---|---|---|---|---|---|---|---|---|---|---|---|---|
| MPDCCH | 0 | 1 | 2 | 3 | 4 | 5 | 6 | 7 | 8 | 9 | 10 | |
| PDSCH | 7 | | 0 | 1 | 2 | 3 | 4 | 5 | 6 | 7 | 8 | 9 |
| PUCCH (ACK) | | | | | | | | | | | | |

Fig. 7

Table 4A

| Valid subframe | 1 | 1 | 1 | 0,0 | 1 | 1 | 1 | 1 | 1 | 0,0 | 1 | 1 | 1 | 1 | 1 | 0,0 | 1 | 1 | 1 | 1 | 1 | 0,0 | 1 | 1 |
|---|---|---|---|---|---|---|---|---|---|---|---|---|---|---|---|---|---|---|---|---|---|---|---|---|
| subframe No | 0 | 1 | 2 | 3,4 | 5 | 6 | 7 | 8 | 9 | 10,11 | 12 | 13 | 14 | 15 | 16 | 17,18 | 19 | 20 | 21 | 22 | 23 | 24,25 | 26 | 27 |
| MPDCCH | 0 | 1 | 2 | | | | | | | | | | | | | | | | | | | | | |
| PDSCH | | | | | 1 | 2 | 3 | 4 | 5 | | | | | | | | | | | | | | | |
| ACK/NACK | | | | | | | | | | | | | | | | | | | | | | | | |
| 2-bit field in DCI | 0 | 0 | 0 | | 0 | 0 | 0 | 0 | 0 | | 0 | 0 | 0 | 0 | 0 | | 0 | 0 | 0 | 0 | 0 | | | |

Table 4B

| Valid sub-frame | 1,0,0,1 | 1 | 1 | 1 | 1 | 1,0,0,1 | 1 | 1 | 1 | 1 | 1,0,0,1 | 1 | 1 | 1 | 1 | 1,0,0,1 | 1 | 1 | 1 | 1 |
|---|---|---|---|---|---|---|---|---|---|---|---|---|---|---|---|---|---|---|---|---|
| Sub-frame No | 22,23,24 | 25 | 26 | 27 | 28 | 29,30,31,32 | 33 | 34 | 35 | 36 | 37,38,39,40 | 41 | 42 | 43 | 44 | 45,46,47,48 | 49 | 50 | 51 | 52 |
| MPDCCH | 0 | 1 | | | | | | | | | | | | | | | | | | |
| PDSCH | 0 | 1 | | | | | | | | | | | | | | | | | | |
| ACK/NACK | 0 | 0 | | | | | | | | | | | | | | | | | | |
| 2-bit Field in DCI | 0 | 0 | | | | | | | | | | | | | | | | | | |

Fig. 8

Table 6A

| Valid subframe | 1 | 1 | 0 | 0 | 0 | 0 | 1 | 1 | 1 | 1 | 1 | 1 | 0 | 0 | 0 | 0 | 1 | 1 | 1 | 1 | 1 | 1 |
|---|---|---|---|---|---|---|---|---|---|---|---|---|---|---|---|---|---|---|---|---|---|---|
| Subframe | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| MPDCCH | 0 | 1 |  |  |  |  | 2 | 3 | 4 | 5 | 6 | 7 |  |  |  |  | 8 | 9 | 10 | 11 | 12 | 13 |
| PDSCH |  |  |  |  |  |  | 0 | 1 | 2 | 3 | 4 | 5 |  |  |  |  | 6 | 7 | 8 | 9 | 10 | 11 |
| ACK/NACK |  |  |  |  |  |  |  |  |  |  |  |  |  |  | 0 | 1 |  |  |  |  |  |  |
| 3-bit field in DCI or "1-bit (new or borrowed from other field)+"Repetition number" field in DCI" | 0 0 0 | 0 0 0 |  |  |  |  | 0 0 0 | 0 0 0 | 0 0 0 | 0 1 1 | 0 0 0 | 1 0 0 |  |  |  |  | 0 0 0 | 0 0 0 | 0 0 0 | 0 0 0 | 0 1 1 | 1 0 0 |

Table 6B

| Valid subframe | 0 | 0 | 0 | 0 | 1 | 1 |
|---|---|---|---|---|---|---|
| Subframe | 22 | 23 | 24 | 25 | 26 | 27 |
| MPDCCH |  |  |  |  | 0 | 1 |
| PDSCH |  |  |  |  | 12 | 13 |
| ACK/NACK |  |  | 0 | 1 |  |  |
| 3-bit field in DCI or "1-bit (new or borrowed from other field)+"Repetition number" field in DCI" |  |  |  |  | 0 0 0 | 0 0 0 |

Fig. 9

Table 8A

| Invalid UL subframe denoted by "0" | 1 | 0 | 1 | 1 | 1 | 1 | 1 | 1 | 1 | 0 | 1 | 0 | 1 | 1 | 1 | 1 | 1 | 1 | 1 |
|---|---|---|---|---|---|---|---|---|---|---|---|---|---|---|---|---|---|---|---|
| Invalid DL subframe denoted by "0" | 1 | 1 | 1 | 0 | 0 | 1 | 1 | 1 | 0 | 1 | 1 | 1 | 0 | 0 | 1 | 1 | 1 | 1 | 1 |
| subframe No | 0 | 1 | 2 | 3 | 4 | 5 | 6 | 7 | 8 | 9 | 10 | 11 | 12 | 13 | 14 | 15 | 16 | 17 | 18 |
| MPDCCH | 0 | 1 | 2 |   |   | 3 | 4 | 5 | 6 |   | 7 | 8 | 9 |   |   | 10 | 11 |   |   |
| PDSCH |   |   | 0 |   |   | 1 | 2 | 3 | 4 |   | 5 | 6 | 7 |   |   | 8 | 9 |   |   |
| ACK/NACK |   |   |   |   |   |   |   |   |   |   |   |   |   |   |   |   |   |   | 0 |
| "Repetition number" field in DCI | 0 | 0 | 0 |   |   | 0 | 0 | 0 | 0 |   | 0 | 0 | 0 |   |   | 0 | 1 |   |   |
|  | 0 | 0 | 0 |   |   | 0 | 0 | 0 | 0 |   | 0 | 0 | 0 |   |   | 1 | 0 |   |   |

Table 8B

| Invalid UL subframe denoted by "0" | 0 | 1 | 0 | 1 | 1 | 1 | 1 | 1 | 1 | 1 | 0 |
|---|---|---|---|---|---|---|---|---|---|---|---|
| Invalid DL subframe denoted by "0" | 0 | 1 | 1 | 1 | 0 | 0 | 1 | 1 | 1 | 1 | 0 |
| subframe No | 19 | 20 | 21 | 22 | 23 | 24 | 25 | 26 | 27 | 28 | 29 |
| MPDCCH |   |   |   |   |   |   | 0 | 1 | 2 | 3 |   |
| PDSCH |   |   |   |   |   |   | 10 | 11 | 10 | 11 |   |

Fig. 10

Table 10A

| MGL | | | | | | | | | | | | | | | |
|---|---|---|---|---|---|---|---|---|---|---|---|---|---|---|---|
| Invalid UL subframe denoted by "0" | 1 | 0 | 1 | 1 | 1 | 1 | 1 | 1 | 1 | 0 | 1 | 0 | 1 | 1 | 1 | 1 |
| Invalid DL subframe denoted by "0" | 1 | 1 | 1 | 0 | 0 | 1 | 1 | 1 | 1 | 0 | 1 | 1 | 1 | 0 | 0 | 1 |
| subframe No | 0 | 1 | 2 | 3 | 4 | 5 | 6 | 7 | 8 | 9 | 10 | 11 | 12 | 13 | 14 | 15 |
| MPDCCH | 0 | 1 | 2 | | | 3 | 4 | 5 | 6 | | 7 | 8 | 9 | | | 10 |
| PDSCH | | 0 | | | | 1 | 2 | 3 | 4 | | 5 | 6 | 7 | | | 8 |
| ACK/NACK | | | | | | | | | | | | | | | | |
| "Repetition number" field in DCI | 0 0 | 0 0 | 0 0 | | | 0 0 | 0 0 | 0 0 | 0 0 | | 0 0 | 0 0 | 0 0 | | | 0 1 |

Table 10B

| MGL+1 subframes with no UL transmission | | | | | | | | | | | | | | | |
|---|---|---|---|---|---|---|---|---|---|---|---|---|---|---|---|
| Measurement Gap | | | | | | | | | | | | | | | |
| 1 | 1 | 1 | 0 | 1 | 0 | 1 | 1 | 1 | 1 | 1 | 1 | 1 | 0 | 1 |
| 1 | 1 | 1 | 0 | 1 | 1 | 1 | 0 | 0 | 1 | 1 | 1 | 1 | 0 | 1 |
| 16 | 17 | 18 | 19 | 20 | 21 | 22 | 23 | 24 | 25 | 26 | 27 | 28 | 29 | 30 |
| | | | | | | 11 | | | | | | | 0 | 1 |
| | | | | | | 9 | | | | | | | 10 | 11 |
| | | | | | | | | 0 | 1 | 2 | | | | |
| | | | | | | 10 | | | | | | | 00 | 00 |

Fig. 11

METHOD AND APPARATUS FOR PHYSICAL DOWNLINK SHARED CHANNEL SCHEDULING DELAY COUNTING

TECHNICAL FIELD

S The present disclosure generally relates to the field of processing of delays, and more specifically to a method and apparatus for Physical Downlink Shared Channel (PDSCH) scheduling delay counting.

BACKGROUND

A new Work Item (WI) entitled "Rel-17 enhancements for Narrow-band-Internet of Things (NB-IoT) and Long Term Evolution-Machine Type Communication (LTE-MTC)" was agreed recently. In relation to it, one objective for LTE-MTC consists in specifying introduction of 14 Hybrid Automatic Repeat Request (HARQ) processes in downlink (DL) as described below in the following Work Item Description (WID):

Support additional Physical Downlink Shared Channel (PDSCH) scheduling delay for introduction of 14-HARQ processes in DL, for Half Duplex-Frequency Division Duplex (HD-FDD) Cat M1 User Equipments (UEs).

The WID's objective for LTE-MTC targets HD-FDD Cat M1 UEs, which peak data rate can be achieved through the combined usage of 10 HARQ processes and HARQ-acknowledgement (HARQ-ACK) bundling for a Cat M1 HD-FDD UE for MTC Physical Downlink Control Channel (MPDCCH), Physical Downlink Shared Channel (PDSCH), and Physical Uplink Control Channel (PUCCH), as depicted in Tables 1A and 1B.

Physical Uplink Control Channel (PUCCH), as depicted in Tables 1A and 1B illustrated in FIG. 6.

The solid and dotted arrows in Tables 1A and 1B illustrate examples of the "Scheduling delay for PDSCH" (encompassing 2 subframes) and "HARQ-ACK delay" (encompassing 11 subframes), respectively.

The Rel-17 enhancement for LTE-MTC aims at increasing the peak data rate through the "Support of additional PDSCH scheduling delay for introduction of 14-HARQ processes in DL, for HD-FDD Cat MI UEs", which as shown in Tables 2A and 2B illustrated in FIG. 7, and is intended to be done by using the framework depicted in Tables 1A and 1B.

The solid and dotted arrows in Tables 2A and 2B illustrate examples of the "Scheduling delay for PDSCH" (encompassing 7 subframes) and "HARQ-ACK delay" (encompassing 13 subframes), respectively.

With respect to the introduction of 14 HARQ processes in DL, the following has been mentioned in 3GPP TS 36.212 v. 16.1.0:

Assuming a TBS of 1000 bits is transmitted in each of the PDSCH, the peak data rate achieved by this scheduling is (10×1000)/17=588 kbps. In this contribution, we propose to increase the peak data rate to (12×1000)/17=706 kbps (20% increase) by allowing data scheduling in subframes 0 and 1.

See, 3GPP TS 36.212 v. 16.1.0, "Evolved Universal Terrestrial Radio Access (E-UTRA); Multiplexing and channel coding", version 16.1.0. Although the increase in peak data rate is estimated using 12-HARQ processes, there are 14 HARQ processes in total. As can be seen in Tables 2A and 2B, the reason for having 14 HARQ processes (i.e., spanning from #0 to #13) is that the HARQ processes #10 and #11 (tied to MPDCCH 10 and 11) need to wait for the acknowledgement (ACK) bundling that follows the upcoming set of MPDCCHs ending with HARQ processes #12 and #13 (tied to MPDCCH 12 and 13).

From Tables 2A and 2B it can be seen that the introduction of 14 HARQ process in DL would require adding new values for both the Scheduling delay for PDSCH and HARQ-ACK delay.

According; to previous techniques, when there are 10-HARQ processes, the Scheduling delay for PDSCH uses a value of 2 That is, the PDSCH starts on the second subframe after the end of the MPDCCH used to schedule the corresponding DL data. On the other hand, when there are 14 HARQ processes the Scheduling delay for PDSCH requires a value equal to 7 in addition to the legacy value that is equal to 2 (Sec blue arrow in Table 2A).

In 3GPP TS 36.212, it has been proposed that the Scheduling delay for PDSCH can support the value of 7 in addition to the legacy value of 2, and for the HARQ-ACK delay, it has been proposed to use the following values: 4, 5, 6, 7, 9, 11, 13, 15. See, "Evolved Universal Terrestrial Radio Access (E-UTRA); Multiplexing and channel coding", version 16.1.0.

Certain problems exist, however. For example, the proposed techniques for support of 14-HARQ processes in DL, for HD-FDD Cat M1 UEs do not account for further delays caused when the feature happens to coexist with other scenarios/features, which will impact the PDSCH scheduling delays. As another example, the scenarios/features where the 14 HARQ process feature could coexist require a particular handling towards assessing the PDSCH scheduling delays.

SUMMARY

To address the foregoing; problems with existing solutions, new systems, methods and techniques are proposed for determining PDSCH scheduling delay.

According; to certain embodiments, a method implemented by a User Equipment (UE) in a communication network is provided. The method includes receiving an indicator in Downlink Control Information (DCI) and, in response to a presence of a Physical Uplink Control Channel (PUCCH) repetition, counting a scheduling delay for a Physical Downlink Shared Channel (PDSCH) as a function of the received indicator in DCI.

According to certain embodiments, a method implemented by a network node in a communication network is provided. The method includes setting a delay indicator that indicates a scheduling delay for a PDSCH and sending the delay indicator to inform a LIE of the scheduling delay.

According to certain embodiments, a network node in a communication network is provided. The network node comprises a processor and a memory communicatively coupled to the processor and adapted to store instructions. When the instructions are executed by the processor, the instructions cause the network node to perform operations of certain embodiments described herein.

According to certain embodiments, a network node in a communication network is provided. The network node comprises a processor and a memory communicatively coupled to the processor and adapted to store instructions. When the instructions are executed by the processor, the instructions cause the network node to perform operations of certain embodiments described herein.

According to certain embodiments, a non-transitory computer readable medium having a computer program stored thereon is provided. When the computer program is executed by a set of one or more processors of a network node in a communication network, the computer program causes the network node to perform operations of certain embodiments described herein.

Certain embodiments of the present disclosure may provide one or more technical advantages. For example, certain embodiments may provide methods, systems, techniques, and solutions that are applicable when the 14 HARQ processes feature is used in scenarios causing additional PDSCH scheduling delays, a selective PDSCH scheduling delay counting strategy has been developed in the form of Tables providing the accumulated delays when the "14 HARQ processes in DL using HARQ-ACK bundling for a Cat M1 HD-FDD UE".

Other advantages may be readily apparent to one having skill in the art. Certain embodiments may have none, some, or all of the recited advantages

BRIEF DESCRIPTION OF THE DRAWINGS

The present disclosure may be best understood by way of example with reference to the following description and accompanying drawings that are used to illustrate embodiments of the present disclosure. In the drawings:

FIG. 6 illustrates Tables 1A and 2A;
FIG. 7 illustrates Tables 2A and 2B;
FIG. 8 illustrates Tables 4A and 4B;
FIG. 9 illustrates Tables 6A and 5B;
FIG. 10 illustrates Tables 8A and 8B; and
FIG. 11 illustrates Tables 10A and 10B.

DETAILED DESCRIPTION

Figure 1:
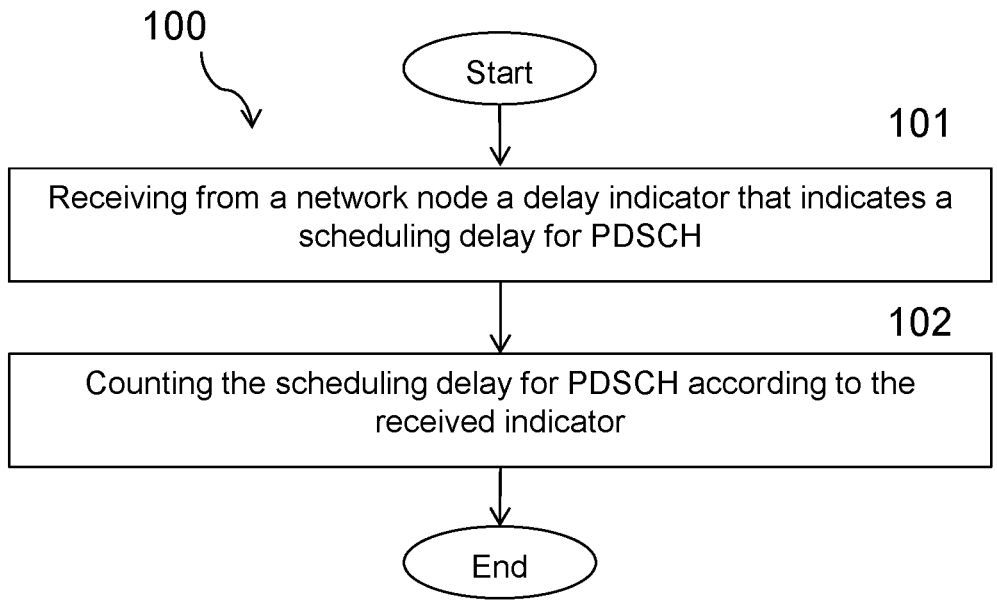
FIG. 1 is a flow chart illustrating a method implemented by a UE in a communication network according to some embodiments of the present disclosure; 1

The following detailed description describes a method and apparatus for delay processing. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed texts and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

In the following detailed description and claims, the terms "coupled" and "connected", along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device stores and transmits (internally and/or with other electronic devices) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other forms of propagated signals such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memoir (e.g., dynamic random access memory (DRAM), static random access memory (SRAM)) of that electronic device. Typical electronic devices also include a set of one or more physical interfaces to establish connections (to transmit and/or receive code and/or data using propagating signals) with other electronic devices. One or more parts of an embodiment of the present disclosure may be implemented using different combinations of software, firmware, and/or hardware.

The embodiments disclosed herein relate at least to the following cases for supporting "14-HARQ processes in DL, for HD-FDD Cat M1 UEs":

Case 1: PUCCH repetitions and Invalid BL/CE DL subframes;
Case 2: PUCCH repetitions, Invalid BL/CE DL subframes and Invalid BL/CE UL subframes;
Case 3: PUCCH repetitions, Invalid BL/CE DL subframes, Invalid BL/CE UL subframes, and measurement gaps.

As discussed above, the Rel-17 objective on introducing 14-HARQ processes in DL, for HD-FDD Cat M1 UEs does not account for further delays caused when the feature happens to coexist with PUCCH repetitions, invalid BL/CE DL subframes, invalid BL/CE UL subframes, and measurement gaps, which will impact the PDSCH scheduling delays. Thus, according to certain embodiments disclosed herein, methods, systems, and techniques are provided to support the introduction of N-HARQ processes in DL, for HD-FDD Cat M1 UEs in presence of PUCCH repetitions, invalid In a particular embodiment, the PDSCH scheduling delays when "14-HARQ processes using HARQ-ACK bundling" are in presence of PUCCH repetitions and Invalid BL/CE DL subframes are determined according with Table 3 where only 3 bundles are allowed.

TABLE 3

| Any 2-bit field in DCI, e.g., the "Repetition number" field In DCI | PDSCH scheduling delay, consists of the total number of added subframes according with 00, 01 or 10, the subframe counting starts after the last subframe in which the MPDCCH is transmitted. |
|---|---|
| 00 | PDSCH scheduling delay = 2 BL/CE DL subframes |
| 01 | PDSCH scheduling delay = 1 BL/CE DL subframe + (2 absolute subframes + 3*Rpucch on absolute subframes) + 1 BL/CE DL subframe |
| 10 | PDSCH scheduling delay = (2 absolute subframes + 3*Rpucch on absolute subframes) + 2 BL/CE DL subframes |
| 11 | Not used/Reserved |

BL/CE DL subframes, invalid BL/CE UL subframes, and/or measurement gaps. For illustration purposes and to stay aligned with the Rel-17 WID, the methods, systems, and techniques disclosed herein are described using 14 HARQ processes as a basis. However, it is recognized that the same design principles (partially or fully) can be applied to any number, N, of HARQ processes.

The term "invalid BL/CE DL subframes" is utilized herein and generally corresponds to the term "non-BL/CE DL subframes" in the 3GPP technical specifications. Additionally, the term "cross UL transmission" is used herein to describe a case of DL data scheduling for a particular DL HARQ process where an uplink (UL) PUCCH transmission takes place between the MPDCCH carrying the DL grant and the associated PDSCH carrying the DL data.

Case 1: Introduction of 14 HARQ Processes Using HARQ-ACK Bundling in Presence of PUCCH Repetitions and Invalid BL/CE DL Subframes.

The HARQ-ACK bundling will be part of the framework towards the support of 14 HARQ processes in DL for HD-FDD Cat M1 UEs. When HARQ-ACK bundling is used, up to 4 transport blocks (TBs) can be multiplexed per PUCCH. This means that the 14 HARQ processes in DL can be supported by using 3 PUCCHs. Recall that, although there are 14 HARQ processes in total, the increase in peak data rate is estimated using 12-HARQ processes due that 2 out of 14 processes require cross UL transmissions. Tables 2A and 2B above provide further illustration.

Within the context of Case 1, Section I and II below describe respectively the proposed solutions considering strictly 3 bundles (i.e., the use of 3 PUCCHs) and any number of bundles (i.e., the use of either 1, 2, or 3 PUCCHs).

I. 14 HARQ Processes Using HARQ-ACK Bundling in Presence of PUCCH Repetitions and Invalid BL/CE DL Subframes Usable Only with 3 Bundles (3 PUCCHs Only).

According to certain embodiments, a 2-bit field in DCI Format 6-1A is used to indicate the PDSCH scheduling delay, which makes use of the fact that maximum 2 HARQ processes can be scheduled with cross 111, transmission.

In a particular embodiment, the DCI field for indication of the number of PDSCH repetitions in DCI Format 6-1A, described as "Repetition number—2 bits" field in subclause 7.1.11 of 3GPP TS 36.212 v. 16.1.0, is repurposed to indicate the PDSCH scheduling delay making use of the fact that maximum 2 HARQ processes can be scheduled with cross UL transmission.

The presence of PUCCH repetitions is described through the term Rpucch.

In a further particular embodiment, the sign "+" means "followed by" as to account for the order in which the delays are counted.

In a further particular embodiment, the definition of BL/CE DL subframe remains the same as previous methods and techniques, whereas the definition of absolute subframe refers to any type of subframe.

In a further particular embodiment, the expression "(2 absolute subframes+3*Rpucch on absolute subframes)" refers to 2 absolute subframes for DL-to-UL, and UL-to-DL switching respectively, whereas the +3*pucch-NumRepetitionCE-format1 absolute subframes are for PUCCH transmissions.

In a further particular embodiment, it is assumed that an invalid BL/CE DL subframe can be used to perform either a DL-to-UL switching, UL-to-DL switching, or to transmit in UL (e.g, PUCCH).

An example to illustrate the applicability of Table 3 is depicted in Tables 4A and 4B illustrated in FIG. 8. In the example of Tables 4A and 4B, the sequence of bits 1110011110 is used as the periodic downlink subframe bitmap, where "1" represents valid subframes and "0" represents invalid subframes, and where a 2-bit field in DCI Format 6-1A (illustrated in the last row of Tables 4A and 4B) determines the PDSCH scheduling delays according with Table 3.

The time progression of the continues in Table 4B.

According to the example of Tables 4A and 4B, in subframe #0, MPDCCH 0 has been used to schedule PDSCH 0, which starts on the second BL/CE DL subframe after the last subframe in which the MPDCCH is transmitted. The PDSCH scheduling delay=2 BL/CE DL subframes according with the combination "00" in Table 3, which will be associated to MPDCCH 0.

According to the example of Tables 4A and 4B, in sublime #1, MPDCCH 1 has been used to schedule PDSCH 1, which also starts on the second BL/CE DL subframe after the last subframe in which the MPDCCH is transmitted Note that using the terminology "BL/CE DL subframe" at the moment of counting the PDSCH scheduling delays allow to skip the presence of invalid BL/CE DL subframes. In other words, the counting terminology in Table 3 makes that the invalid BL/CE DL subframes won't contribute to the PDSCH scheduling delays. Hence, the PDSCH scheduling delay=2

BL/CE DL subframes according with the combination "00" in Table 3, which will be associated to MPDCCH 1.

According to the example of Tables 4A and 4B, in subframe #15 the situation is different because the HARQ process #10 is subject to cross scheduling. That is, MPDCCH 10 and PDSCH 10 are separated by UL transmission. For this reason, Table 3 uses the combination "01" as to account for the neighbour 1 BL/CE DL subframe, followed by 1 absolute subframe used for DL-to-UL switching, then 3*Rpucch on absolute subframes (accounting for PUCCH repetitions if any), followed by 1 absolute subframe used for UL-to-DL switching, and finally 1 BL/CE DL subframe. Based on the above, in this example the PDSCH scheduling delay=7 subframes according with the combination "01" in Table 3, which will be associated to MPDCCH 10.

According to the example of Tables 4A and 45, in subframe #16, HARQ process #11 is also subject to cross scheduling being the only difference with respect to HARQ process #10 that the DL-to-UL switching is adjacent to it, and because of that Table 3 makes use of combination "10". The PDSCH scheduling delay=7 subframes according with the combination "10" in Table 3, which will be associated to MPDCCH 11. Recall that the proposed counting strategy allows to skip the presence of invalid subframes.

II: 14 HARQ Processes Using HARQ-ACK Bundling in Presence of PUCCH Repetitions and Invalid BL/CE DL Subframes Usable with any Number of Bundles (i.e., Either 1, 2, or 3 PUCCHs).

Relaying on the same principles described in subsection 1 above, Table 5 below corresponds to an extension of Table 3 where either 1, 2, or 3 bundles can be used.

In a particular embodiment, the PDSCH scheduling delays when "14-HARQ processes using HARQ-ACK bundling" are in presence of PUCCH repetitions and Invalid BL/CE DL subframes, are determined according with Table 5 where any number of bundles are allowed.

An example to illustrate the applicability of Table 5 is depicted in Tables 6A and 6B illustrated in FIG. 9.

An example to illustrate the applicability of Table 5 is depicted in Tables 6A and 6B In the example of Tables 6A and 6B, 2 bundles (i.e., 2 PUCCHs) and the sequence of bits 1100001111 are used as the periodic downlink subframe bitmap, where "1" represents valid subframes and "0" represents invalid subframes, and 1 bit (new or borrowed from other field in DCI)+"Repetition number" field in DCI Format 6-1A (illustrated in the last row of Tables 6A and 6B) determines the PDSCH scheduling delays according with Table 5.

Case 2: Introduction of 14 HARQ Processes Using HARQ-ACK Bundling in Presence of PUCCH Repetitions. Invalid BL/CE DL Subframes, and Invalid BL/CE UL Subframes.

In addition to invalid BL/CE DL subframes, there can scenarios where also invalid BL/CE UL subframes might be present. To account for the presence of PUCCH repetitions. Invalid BL/CE DL subframes, and Invalid BL/CE UL subframes, certain embodiments are described as relating to Case 2, which use Case 1 as a framework and incorporate additional terminology to prevent that the invalid BL/CE UL, subframes cause further PDSCH scheduling delays.

Using Table 3 as framework, in a particular embodiment, the PDSCH scheduling delays when "14-HARQ processes using HARQ-ACK bundling" are in presence of PUCCH repetitions, Invalid BL/CE DL subframes, and Invalid BL/CE 111, subframes are determined according with Table 7 where only 3 bundles are allowed.

TABLE 5

| Any 3-bit field in DCI, e.g., the 1-bit (new or borrowed from other field) + "Repetition number" field in DCI | PDSCH scheduling delay, consists of the total number of added subframes according with 000, 001, 010, 011, 100, 101, 110, and 111 the subframe counting starts after the last subframe in which the MPDCCH is transmitted | Note |
| --- | --- | --- |
| 000 | PDSCH scheduling delay = 2 BL/CE DL subframes | |
| 001 | PDSCH scheduling delay = 1 BL/CE DL subframe + (2 absolute subframes + 1*Rpucch on absolute subframes) + 1 BL/CE DL subframe | 1 HARQ-ACK bundle |
| 010 | PDSCH scheduling delay = (2 absolute subframes + 1*Rpucch on absolute subframes) + 2 BL/CE DL subframes | 1 HARQ-ACK bundle |
| 011 | PDSCH scheduling delay = 1 BL/CE DL subframe + (2 absolute subframes + 2*Rpucch on absolute subframes) + 1 BL/CE DL subframe | 2 HARQ-ACK bundles |
| 100 | PDSCH scheduling delay = (2 absolute subframes + 2*Rpucch on absolute subframes) + 2 BL/CE DL subframes | 2 HARQ-ACK bundles |
| 101 | PDSCH scheduling delay = 1 BL/CE DL subframe + (2 absolute subframes + 3*Rpucch on absolute subframes + 1 BL/CE DL subframe | 3 HARQ-ACK bundles |
| 110 | PDSCH scheduling delay = (2 absolute subframes + 3*Rpucch on absolute subframes) + 2 BL/CE DL subframes | 3 HARQ-ACK bundles |
| 111 | Not used/Reserved | |

TABLE 7

| Any 2-bit field in DCI, e.g., "Repetition number" field in DCI | PDSCH scheduling delay, consists of the total number of added subframes according with 00, 01 or 10, the subframe counting starts after the last subframe in which the MPDCCH is transmitted |
|---|---|
| 00 | PDSCH scheduling delay = 2 BL/CE DL subframes |
| 01 | PDSCH scheduling delay = 1 BL/CE DL subframe + 1 absolute subframe + 3*Rpucch on BL/CE UL subframes + 1 absolute subframe + 1 BL/CE DL subframe |
| 10 | PDSCH scheduling delay = 1 absolute subframe + 3*Rpucch on BL/CE UL subframes + 1 absolute subframe + 2 BL/CE DL subframes |
| 11 | Not used/Reserved |

In a further particular embodiment, the sign "+" means "followed by" as to account for the order in which the delays are counted.

In a further particular embodiment, the definition of BL/CE DL subframe and BL/CE UL subframe remain the same as previous methods and techniques, whereas the definition of absolute subframe refers to any type of subframe.

In a further particular embodiment, it is assumed that an invalid BL/CE DL subframe can be used to perform either a DL-to-UL switching, UL-to-DL switching, or to transmit in UL PUCCH).

In a further particular embodiment, it is assumed that an invalid BL/CE UL subframe can be used to perform either a DL-to-UL switching, UL-to-DL switching, or to transmit in DL MPDCCH, or PDSCH).

An example to illustrate the applicability of Table 7 is depicted in Tables 8A and 8B illustrated in FIG. 10. In the example of Tables 8A and 8B, the sequence of bits 1011111110 and 1110011110 are used as the periodic uplink and downlink subframe bitmaps respectively where "0" represents invalid subframes, and the "Repetition number" field in D0 Format 6-1A (illustrated in the last row of the below diagram) determines the PDSCH scheduling delays according with Table 7.

In a particular embodiment, Table 7 can use Table 5 as a framework in order to not restrict Case 2 to be used only with 3 bundles, but with any number of bundles.

Case 3: Introduction of 1-1 HARQ Processes Using HARQ-ACK Bundling in Presence of PUCCH Repetitions. Invalid BL/CE DL Subframes, Invalid BL/CE UL Subframes, and Measurement Gaps.

In addition to accounting for the presence of PUCCH repetitions, Invalid BL/CE DL subframes, and Invalid BL/CE UL subframes, certain embodiments described herein with reference to Case 3 use Case 2 as framework and incorporate additional terminology to prevent the further delays caused from Measurement Gaps (MG). The measurement gap duration and its periodicity are defined through the variable Measurement Gap Length (MGL) and the Measurement Gap Repetition Period (MGRP) as defined in 3GPP TS 36.133.

When MG fully or partially overlaps BL/CE UL subframes or BL/CE DL subframes there won't be (i.e., respectively) DL transmissions on the subframes encompassing the MGL nor UL transmissions on the same MGL+1 subframe either. The +1 subframe is because it is assumed that Cat-M1 UEs cannot transmit anything in UL in the subframe after the measurement gap. MG affects PDSCH scheduling delay with and without "cross UL transmission" scheduling.

Using Table 3 as framework, in a particular embodiment, the PDSCH scheduling delays when "14-HARQ processes using HARQ-ACK bundling" are in presence of PUCCH repetitions, invalid BL/CE DL subframes, Invalid BL/CE UL subframes and Measurement Gaps are determined according with Table 9 where only 3 bundles are allowed.

TABLE 9

| Any 2-bit field in DCI, e.g., "Repetition number" field in DCI | PDSCH scheduling delay, consists of the total number of added subframes according with 00, 01 or 10, the subframe counting starts after the last subframe in which the MPDCCH is transmitted |
|---|---|
| 00 | PDSCH scheduling delay = 2 BL/CE DL subframes no overlapping measurement gaps |
| 01 | PDSCH scheduling delay = 1 BL/CE DL subframe no overlapping measurement gaps + 1 absolute subframe unless it overlaps measurement gaps + (3*Rpucch on BL/CE UL subframes no overlapping measurement gaps + 1 absolute subframe in case it is preceded by a measurement gap) + 1 absolute subframe including overlapping measurement gaps + 1 BL/CE DL subframe no overlapping measurement gaps. |
| 10 | PDSCH scheduling delay = 1 absolute subframe unless it overlaps measurement gaps + (3*Rpucch on BL/CE UL subframes no overlapping measurement gaps + 1 absolute subframe in case it is preceded by a measurement gap) + 1 absolute subframe including overlapping measurement gaps 2 BL/CE DL subframes no overlapping measurement gaps. |
| 11 | Not used/Reserved |

In a further particular embodiment, the definition of BL/CE DL subframe, BL/CE UL subframe, and measurement gaps remain the same as previous techniques and methods, whereas the definition of absolute subframe refers to any type of subframe.

In a further particular embodiment, it is assumed that an invalid BL/CE DL subframe can be used to perform either a DL-to-UL switching, UL-to-DL switching, or to transmit in DL (e.g., PUCCH).

In a further particular embodiment, it is assumed that an invalid BL/CE UL subframe can be used to perform either a DL-to-UL switching, UL-to-DL switching, or to transmit in DL (e.g., MPDCCH, or PDSCH).

In a further particular embodiment, the word "including" in Table 9 relies on the assumption that the UL-to-DL switching can occur during a measurement gap. The above refers to two consecutive DL related actions at the UE side, measuring and thereafter monitoring.

An example to illustrate the applicability of Table 9 is depicted in Tables 10A and 10B illustrated in FIG. 11. In the example of Tables 10A and 10B. the sequence of bits 1011111110 and 1110011110 are used as the periodic uplink and downlink subframe bitmaps respectively, where "0" represents invalid subframes, and the "Repetition number" field in DCI Format 6-1A (illustrated in the last row of the below diagram) determines the PDSCH scheduling delays according with Table 9.

In a particular embodiment, Table 9 can use Table 5 as a framework in order to do not restrict Case 3 to be used only with 3 bundles, but with any number of bundles.

In a particular embodiment the PDSCH Scheduling delay counting strategies for the support of 14 HARQ processes in DL can be described as set of rules or any other form/format than the Table format used in this disclosure (e.g., Table 3, 5, 7, and 9).

FIG. 1 illustrates an example method 100 implemented by a UE in a communication network, according to certain embodiments. The method 100 may be performed in a UE, by way of example only, and it is not limited thereto.

In one embodiment, the method 100 may begin at step 101 when the UE receives, from a network node, a delay indicator that indicates a scheduling delay for PDSCH. Then, at step 102, the UE counts the scheduling delay for PDSCH according to the received indicator In a particular embodiment counting the scheduling delay for PDSCH according to the received indicator includes counting the scheduling delay by accounting for uplink control channel repetition if a HARQ process is subject to cross scheduling in response to a presence of PUCCH repetition.

In a particular embodiment, the method 100 further includes receiving from the network node a number of PUCCH repetition, $N_{R_{PUCCH}}$, in Radio Resource Control (RRC) signaling and counting the scheduling delay for PDSCH according to the number of PUCCH repetition, $N_{R_{PUCCH}}$.

In a particular embodiment, counting the scheduling delay according to the received indicator includes counting the scheduling delay by further accounting for a number of bundles of PUCCH in response to a presence of PUCCH bundles.

In a particular embodiment, the method 100 further includes receiving, from the network node, a number of bundles of PUCCH. $N_{bundle}$, in Downlink Control Information (DCI) and counting the scheduling delay for PDSCH according to the number of bundles of PUCCH, $N_{bundle}$.

In a particular embodiment, the number of bundles of PUCCH $N_{bundle}$ is any one of 3, 2 and 1.

In a particular embodiment, in response to a presence of invalid downlink subframes, the scheduling delay may be counted as follows:

D1=1 BL/CE DL subframe+(2 absolute subframes+$N_{bundle}*N_{R_{PUCCH}}$ on absolute subframes)+1 BL/CE DL subframe, or D2=(2 absolute subframes+$N_{bundle}*N_{R_{PUCCH}}$ absolute subframes)+2 BL/CE DL subframes;

In this example, D1 is the scheduling delay for a first HARQ process being subject to the crossing schedule, D2 is the scheduling delay for HARQ processes following the first HARQ process, the absolute subframe refers to any type of subframe, $N_{bundle}$ refers to a number of bundles of PUCCH, and $N_{R_{PUCCH}}$ refers to a number of PUCCH repetition.

In a particular embodiment, in response to a presence of invalid downlink subframes and invalid uplink subframes, the scheduling delay may be counted as follows:

D1=1 BL/CE DL subframe+1 absolute subframe+$N_{bundle}*N_{R_{PUCCH}}$ on BL/CE UL subframe+1 absolute subframe+1 BL/CE DL subframe, or D2=1 absolute subframe+$N_{bundle}*N_{R_{PUCCH}}$ on BL/CE UL subframe+1 absolute subframe+2 BL/CE DL subframes;

In this example, D1 is the scheduling delay for a first HARQ process being subject to the crossing schedule, D2 is the scheduling delay for HARQ processes following the first HARQ process, the absolute subframe refers to any type of subframe, $N_{bundle}$ refers to a number of bundles of PUCCH, and $N_{R_{PUCCH}}$ refers to a number of PUCCH repetition.

In a particular embodiment, in response to a presence of invalid downlink subframes, invalid uplink subframes and measurement gap, the scheduling delay may be counted as follows:

D0=2 BL/CE DL subframes no overlapping measurement gaps;

D1=1 downlink valid subframe no overlapping any of the measurement gaps+1 absolute subframe unless it overlaps any of the measurement gaps+($N_{bundle}*N_{R_{PUCCH}}$ on BL/CE UL subframes no overlapping any of the measurement gaps as well as 1 absolute subframe in case it is preceded by any of the measurement gaps)+1 absolute subframe including overlapping measurement gaps+1 BL/CE DL subframe no overlapping any of the measurement gaps; or D2=1 absolute subframe unless it overlaps any of the measurement gaps+$N_{bundle}*N_{R_{PUCCH}}$ on BL/CE UL, subframes no overlapping any of the measurement gaps+1 absolute subframe in case it is preceded by any of the measurement gaps)+1 absolute subframe including overlapping any of the measurement gaps+2 BL/CE DL subframes no overlapping measurement gaps, In this example, D0 is the scheduling delay for a HARQ process being not subject to the crossing schedule, D1 is the scheduling delay for a first HARQ process being subject to the crossing schedule, D2 is the scheduling delay for HARQ processes following the first HARQ process, the absolute subframe refers to any type of subframe, $N_{bundle}$ refers to a number of bundles of PUCCH, and $N_{R_{PUCCH}}$ refers to a number of PUCCH repetition.

Figure 2:
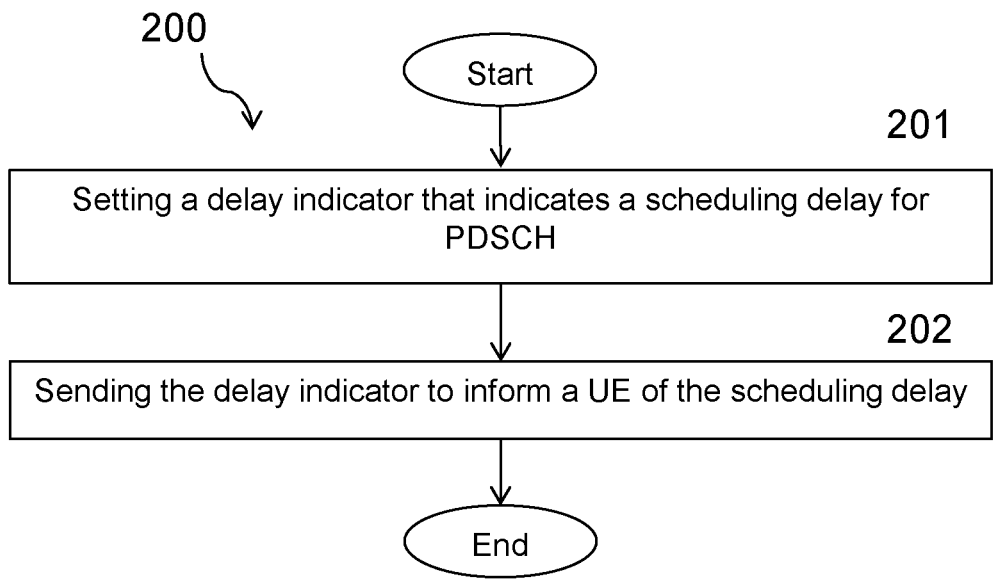
FIG. 2 is a flow chart illustrating a method implemented by a network node in a communication network according to some embodiments of the present disclosure.

FIG. 2 illustrates an example method 200 implemented by a network node in a communication network, according to certain embodiments. The method 200 may be performed in a network node, by way of example only, and it is not limited thereto.

According to certain embodiments, the method 200 may begin at step 201 when the network node sets a delay, indicator that indicates a scheduling delay for PDSCH. At step 202, the network node sends the delay indicator to infirm a UE of the scheduling delay.

In a particular embodiment, the scheduling delay accounts for uplink control channel repetition if a HARQ process is subject to cross scheduling in response to a presence of PUCCH repetition.

In a particular embodiment, the method 200 further includes sending, to the UE, a number of PUCCH repetition, $N_{R_{PUCCH}}$, in RRC signaling and informing the UE to count the scheduling delay for PDSCH according to the number of PUCCH repetition, $N_{R_{PUCCH}}$.

In a particular embodiment, the scheduling delay further accounts for a number of bundles of PUCCH in response to a presence of PUCCH bundles.

In a particular embodiment, the method 200 further includes sending, to the UE, a number of bundles of PUCCH, $N_{bundle}$, in DCI and informing the UE to count the scheduling delay for PDSCH according to the number of bundles of PUCCH, $N_{bundle}$.

In a further particular embodiment, the number of bundles of PUCCH $N_{bundle}$ is any one of 3, 2 and 1.

In a particular embodiment, in response to a presence of invalid downlink subframes, the network node sends the delay indicator to inform the LIE of the scheduling delay as follows:
- D1=1 SLICE DL subframe+(2 absolute subframes+$N_{bundle}*N_{R_{PUCCH}}$ on absolute subframes)+1 BL/CE DL subframe, or
- D2=(2 absolute subframes+$N_{bundle}*N_{R_{PUCCH}}$ on absolute subframes)+2 BL/CE DL subframes:

In this example, D1 is the scheduling delay for a first HARQ process being subject to the crossing schedule, D2 is the scheduling delay for HARQ processes following the first HARQ process, the absolute subframe refers to any type of subframe, $N_{bundle}$ refers to a number of bundles of PUCCH, and $N_{R_{PUCCH}}$ refers to a number of PUCCH repetition.

In a particular embodiment, in response to a presence of invalid downlink subframes and invalid uplink subframes, the network node sends the delay indicator to inform the LIE of the scheduling delay as follows:
- D1=1 BL/CE DL subframe+1 absolute subframe+$N_{bundle}*N_{R_{PUCCH}}$ on BL/CE UL subframe+1 absolute subframe+1 BL/CE DL subframe, or
- D2=1 absolute subframe+$N_{bundle}*N_{R_{PUCCH}}$ on BL/CE UL subframe+1 absolute subframe+2 BL/CE DL subframes;

In this example, D1 is the scheduling delay for a first HARQ process being subject to the crossing schedule, D2 is the scheduling delay for HARQ processes following the first HARQ process, the absolute subframe refers to any type of subframe, $N_{bundle}$ refers to a number of bundles of PUCCH, and $N_{R_{PUCCH}}$ refers to a number of PUCCH repetition.

In a particular embodiment, in response to a presence of invalid downlink subframes, invalid uplink subframes and measurement gap, the network node may send the delay indicator to inform the UE of the scheduling delay as follows:
- D0=2 BL/CE DL subframes no overlapping measurement gaps;
- D1=1 downlink valid subframe no overlapping any of the measurement gaps+1 absolute subframe unless it overlaps any of the measurement gaps+($N_{bundle}*N_{R_{PUCCH}}$ on BL/CE UL subframes no overlapping any of the measurement gaps as well as 1 absolute subframe in case it is preceded by any of the measurement gaps)+1 absolute subframe including overlapping measurement gaps+1 BL/CE DL subframe no overlapping any of the measurement gaps; or
- D2=1 absolute subframe unless it overlaps any of the measurement gaps+($N_{bundle}*N_{R_{PUCCH}}$ on BL/CE UL subframes no overlapping any of the measurement gaps+1 absolute subframe in case it is preceded by any of the measurement gaps)+1 absolute subframe including overlapping any of the measurement gaps+2 BL/CE DL subframes no overlapping measurement gaps, In this example, D0 is the scheduling delay for a HARQ process being not subject to the crossing schedule, D1 is the scheduling delay for a first HARQ process being subject to the crossing schedule, D2 is the scheduling delay for HARQ processes following the first HARQ process, the absolute subframe refers to any type of subframe, $N_{bundle}$ refers to a number of bundles of PUCCH, and $N_{R_{PUCCH}}$ refers to a number of PUCCH repetition.

Figure 3:
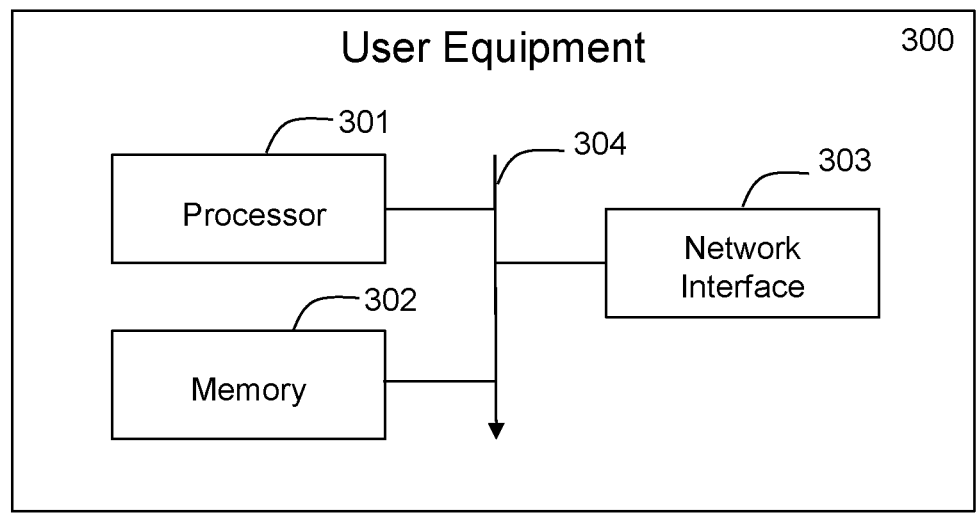
FIG. 3 is a block diagram illustrating a user equipment for delay processing according to some embodiments of the present disclosure.

FIG. 3 illustrates an example user equipment 300 for delay processing, according to certain embodiments. It should be appreciated that the user equipment 300 may be implemented using components other than those illustrated in FIG. 3 and is not limited thereto.

In the example of FIG. 3, the user equipment 300 may include at least a processor 301, a memory 302, an interface 303, and a communication medium 304. The processor 301, the memory 302 and the interface 303 may be communicatively coupled to each other via the communication medium 304.

The processor 301 may include one or more processing units. A processing unit may be a physical device or article of manufacture comprising one or more integrated circuits that read data and instructions from computer readable media, such as the memory 302, and selectively execute the instructions. In various embodiments, the processor 301 may be implemented in various ways. As an example, the processor 301 may be implemented as one or more processing cores. As another example, the processor 301 may comprise one or more separate microprocessors. In yet another example, the processor 301 may comprise an application-specific integrated circuit (ASIC) that provides specific functionality. In still another example, the processor 301 may provide specific functionality by using an ASIC and/or by executing computer-executable instructions.

The memory 302 may include one or more computer-usable or computer-readable storage medium capable of storing data and/or computer-executable instructions. It should be appreciated that the storage medium is preferably a non-transitory storage medium.

The interface 303 may be a device or article of manufacture that enables the user equipment 300 to send data to or receive data from external devices.

The communication medium 304 may facilitate communication among the processor 301, the memory 302 and the interface 303. The communication medium 304 may be implemented in various ways. For example, the communication medium 304 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 3, the instructions stored in the memory 302 may include those that, when executed by the processor 301, cause the user equipment 300 to implement the method described with respect to FIG. 1. For example, the instructions stored in memory 302 may include instructions, that when executed by the processor 301, cause the user equipment 300 to receive, from a network node, a delay indicator that indicates a scheduling delay, for PDSCH and count the scheduling delay for PDSCH according to the received indicator.

Figure 4:
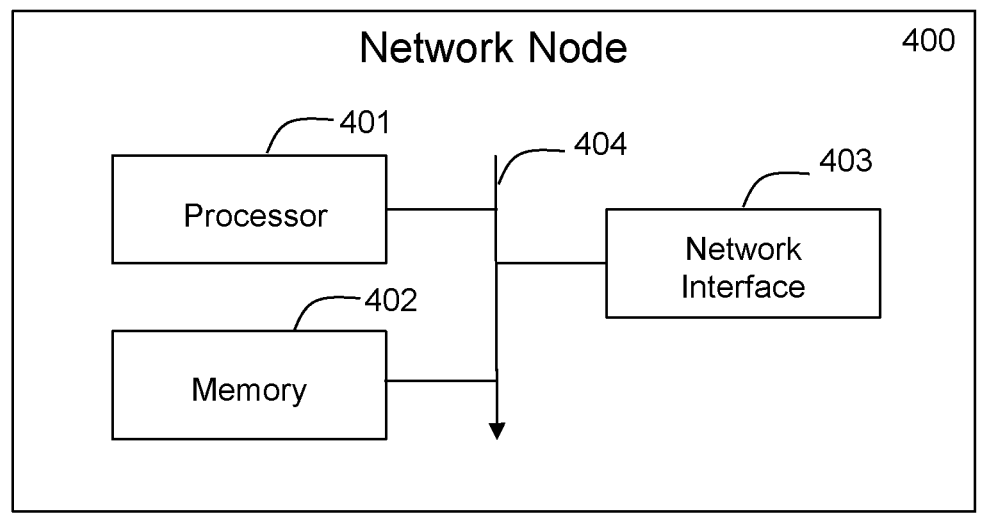
FIG. 4 is a block diagram illustrating a network node for delay processing according to some embodiments of the present disclosure.

FIG. 4 illustrates an example network node 400 for delay processing, according to certain embodiments. It should be appreciated that the network node 400 may be implemented using components other than those illustrated in FIG. 4 and is not limited thereto.

In the example of FIG. 4, the network node 400 may comprise at least a processor 401, a memory 402, an interface 403 and a communication medium 404. The processor 401, the memory 402 and the interface 403 may be communicatively coupled to each other via the communication medium 404.

The processor 401 may include one or more processing units. A processing unit may be a physical device or article of manufacture comprising one or more integrated circuits that read data and instructions from computer readable media, such as the memory 402, and selectively execute the instructions. In various embodiments, the processor 401 may be implemented in various ways. As an example, the processor 401 may be implemented as one or more processing cores. As another example, the processor 401 may comprise one or more separate microprocessors. In yet another example, the processor 401 may comprise an application-specific integrated circuit (ASIC) that provides specific functionality. In still another example, the processor 401 may provide specific functionality by using an ASIC and/or by executing computer-executable instructions.

The memory 402 may include one or more computer-usable or computer-readable storage medium capable of storing data and/or computer-executable instructions. It should be appreciated that the storage medium is preferably a non-transitory storage medium.

The interface 403 may be a device or article of manufacture that enables the network node 400 to send data to or receive data from external devices.

The communication medium 404 may facilitate communication among the processor 401, the memory 402 and the interface 403. The communication medium 404 may be implemented in various ways. For example, the communication medium 404 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 4, the instructions stored in the memory 402 may include those that, when executed by the processor 401, cause the network node 400 to implement the method described with respect to FIG. 2. For example, the instructions stored in memory 402 may include instructions, that when executed by the processor 401, cause the network node 400 to set a delay indicator that indicates a scheduling delay for PDSCH and send the delay indicator to inform a UE of the scheduling delay.

Figure 5:
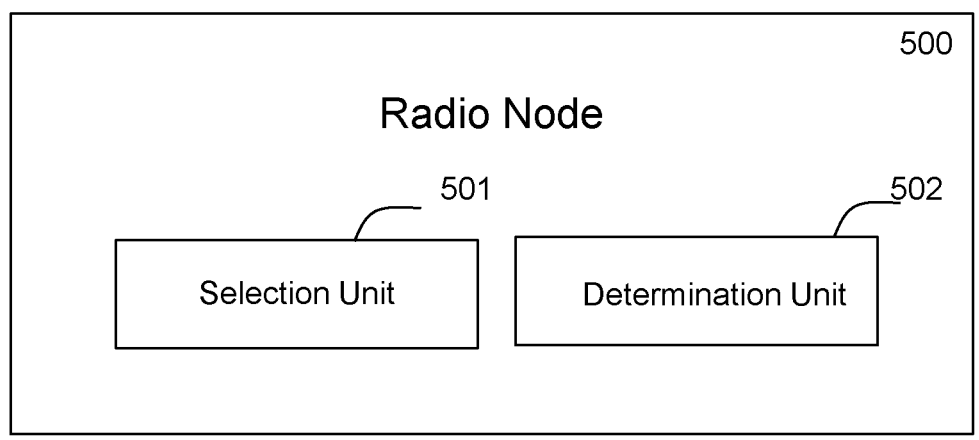
FIG. 5 is another block diagram illustrating a network node for delay processing according to some embodiments of the present disclosure.

FIG. 5 illustrates an example radio node 500 for delay processing, according to certain embodiments. It should be appreciated that the radio node 500 may be implemented using components other than those illustrated in FIG. 5 and is not limited thereto. It may be further appreciated that radio node 510 may include a user equipment such as user equipment 300 or a network node such as network node 400, in particular embodiments.

With reference to FIG. 5, the radio node 500 may comprise at least a selection unit 501 and a determination unit 502. The selection unit 501 may be adapted to perform at least the operation described in the block 101 of FIG. 1 or block 211 of FIG. 2. The determination unit 502 may be adapted to perform at least the operation described in the block 102 of FIG. 1 or block 202 of FIG. 2

Some units are illustrated as separate units in FIG. 5. However, this is merely to indicate that the functionality is separated. The units may be provided as separate elements. However, other arrangements are possible, e.g., some of them may be combined as one unit. Any combination of the units may be implemented in any combination of software, hardware, and/or firmware in any suitable location. For example, there may be more controllers configured separately, or just one controller for all of the components.

The units shown in FIG. 5 may constitute machine-executable instructions embodied within e.g. a machine readable medium, which when executed by a machine will cause the machine to perform the operations described. Besides, any of these units may be implemented as hardware, such as an application specific integrated circuit (ASIC), Digital Signal Processor (DSP), Field Programmable Gate Arran (FPGA) or the like.

Moreover, it should be appreciated that the arrangements described herein are set forth only as examples. Other arrangements (e.g., more controllers or more detectors, etc.) may be used in addition to or instead of those shown, and some units may be omitted altogether. Functionality and cooperation of these units are correspondingly described in more detail with reference to FIG. 1 or 2

Some portions of the foregoing detailed description have been presented in terms of algorithms and symbolic representations of transactions on data bits within a computer memory. These algorithmic descriptions and representations are ways used by those skilled in the signal processing arts to most effectively convey the substance of their work to others skilled in the art. An algorithm is here, and generally, conceived to be a self-consistent sequence of transactions leading to a desired result. The transactions are those requiring physical manipulations of physical quantities Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more signal processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed signal processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method by a User Equipment, UE, in a communication network, the method comprising:
   receiving, from a network node, a delay indicator that indicates a scheduling delay for a Physical Downlink Shared Channel, PDSCH, wherein the scheduling delay refers to a delay between receipt of a control channel scheduling the PDSCH and receiving the PDSCH; and
   counting the scheduling delay for the PDSCH according to the received indicator.

2. The method of claim 1, wherein said counting the scheduling delay for the PDSCH according to the received indicator comprises: counting the scheduling delay by accounting for uplink control channel repetition when a Hybrid Automatic Repeat Request, HARQ, process is subject to cross scheduling in response to a presence of Physical Uplink Control Channel, PUCCH, repetition.

3. The method of claim 2, further comprising:
   receiving from the network node a number of PUCCH repetition, N_(R_PUCCH), in Radio Resource Control, RRC, signaling; and
   counting the scheduling delay for PDSCH according to the number of PUCCH repetition, N_(R_PUCCH).

4. The method of claim 1, wherein said counting the scheduling delay according to the received indicator comprises counting the scheduling delay by further accounting for a number of bundles of PUCCH in response to a presence of PUCCH bundles.

5. The method of claim 4, further comprising:
   receiving, from the network node, a number of bundles of PUCCH, N_bundle, in Downlink Control Information, DCI; and
   counting the scheduling delay for PDSCH according to the number of bundles of PUCCH, N_bundle.

6. The method of claim 5, wherein the number of bundles of PUCCH, N_bundle, is any one of 3, 2 and 1.

7. The method of claim 1, wherein in response to a presence of invalid downlink subframes, counting the scheduling delay, D1 or D2, as follows:
   D1=1 Bandwidth-reduced Low-Complexity or Coverage Enhanced downlink, BL/CE DL, subframe+(2 absolute subframes+N_bundle*N_(R_PUCCH) on absolute subframes)+1 BL/CE DL subframe, or D2=(2 absolute subframes+N_bundle*N_(R_PUCCH) on absolute subframes)+2 BL/CE DL subframes;
   wherein D1 is the scheduling delay for a first HARQ process being subject to the crossing schedule, D2 is the scheduling delay for HARQ processes following the first HARQ process, the absolute subframe refers to any type of subframe, N_bundle refers to a number of bundles of PUCCH, and N_(R_PUCCH) refers to a number of PUCCH repetition.

8. The method of claim 1, wherein in response to a presence of invalid downlink subframes and invalid uplink subframes, counting the scheduling delay, D1 or D2, as follows:
   D1=1 Bandwidth-reduced Low-Complexity or Coverage Enhanced downlink, BL/CE DL, subframe+1 absolute subframe+N_bundle *N_(R_PUCCH) on BL/CE UL subframe+1 absolute subframe+1 BL/CE DL subframe, or
   D2=1 absolute subframe+N_bundle*N_(R_PUCCH) on BL/CE UL subframe+1 absolute subframe+2 BL/CE DL subframes;
   wherein D1 is the scheduling delay for a first HARQ process being subject to the crossing schedule, D2 is the scheduling delay for HARQ processes following the first HARQ process, the absolute subframe refers to any type of subframe, N_bundle refers to a number of bundles of PUCCH, and N_(R_PUCCH) refers to a number of PUCCH repetition.

9. The method of claim 1, wherein in response to a presence of invalid downlink subframes, invalid uplink subframes and measurement gap, counting the scheduling delay comprises:
   D0=2 Bandwidth-reduced Low-Complexity or Coverage Enhanced downlink, BL/CE DL, subframes no overlapping measurement gaps;
   D1=1 downlink valid subframe no overlapping any of the measurement gaps+1 absolute subframe unless it overlaps any of the measurement gaps (N_bundle*N_(R_PUCCH) on BL/CE UL subframes no overlapping any of the measurement gaps as well as 1 absolute subframe when it is preceded by any of the measurement gaps)+1 absolute subframe including overlapping measurement gaps+1 BL/CE DL subframe no overlapping any of the measurement gaps; or
   D2=1 absolute subframe unless it overlaps any of the measurement gaps+ (N_bundle*N_(R_PUCCH) on BL/CE UL subframes no overlapping any of the measurement gaps+1 absolute subframe in case it is preceded by any of the measurement gaps)+1 absolute subframe including overlapping any of the measurement gaps+2 BL/CE DL subframes no overlapping measurement gaps,
where D0 is the scheduling delay for a HARQ process being not subject to the crossing schedule, D1 is the scheduling delay for a first HARQ process being subject to the crossing schedule, D2 is the scheduling delay for HARQ processes following the first HARQ process, the absolute subframe refers to any type of subframe, N_bundle refers to a number of bundles of PUCCH, and N_(R_PUCCH) refers to a number of PUCCH repetition.

10. A method by a network node in a communication network, the method comprising:
setting a delay indicator that indicates a scheduling delay for a Physical Downlink Shared Channel, PDSCH, wherein the scheduling delay refers to a delay between receipt of a control channel scheduling the PDSCH and receiving the PDSCH; and
sending the delay indicator to inform a User Equipment, UE, of the scheduling delay.

11. The method of claim 10, wherein the scheduling delay accounts for uplink control channel repetition when a Hybrid Automatic Repeat Request, HARQ, process is subject to cross scheduling in response to a presence of a Physical Uplink Control Channel, PUCCH, repetition.

12. The method of claim 11, further comprising:
sending to the UE a number of PUCCH repetition, N_(R_PUCCH), in Radio Resource Control, RRC, signaling; and
informing the UE to count the scheduling delay for PDSCH according to the number of PUCCH repetition, N_(R_PUCCH).

13. The method of claim 10, wherein the scheduling delay further accounts for a number of bundles of the PUCCH in response to a presence of PUCCH bundles.

14. The method of claim 13, further comprising:
sending to the UE a number of bundles of PUCCH, N_bundle, in Downlink Control Information, DCI; and
informing the UE to count the scheduling delay for the PDSCH according to the number of bundles of PUCCH, N_bundle.

15. The method of claim 14, wherein the number of bundles of PUCCH, N_bundle, is any one of 3, 2 and 1.

16. The method of claim 10, wherein in response to a presence of invalid downlink subframes, sending the delay indicator to inform the UE of the scheduling delay, D1 or D2, as follows:
D1=1 Bandwidth-reduced Low-Complexity or Coverage Enhanced downlink, BL/CE DL, subframe+(2 absolute subframes+N_bundle*N_(R_PUCCH) on absolute subframes)+1 BL/CE DL subframe, or D2=(2 absolute subframes+N_bundle*N_(R_PUCCH) on absolute subframes)+2 BL/CE DL subframes;
wherein D1 is the scheduling delay for a first HARQ process being subject to the crossing schedule, D2 is the scheduling delay for HARQ processes following the first HARQ process, the absolute subframe refers to any type of subframe, N_bundle refers to a number of bundles of PUCCH, and N_(R_PUCCH) refers to a number of PUCCH repetition.

17. The method of claim 10, wherein in response to a presence of invalid downlink subframes and invalid uplink subframes, sending the delay indicator to inform the UE of the scheduling delay, D1 or D2, as follows:
D1=1 Bandwidth-reduced Low-Complexity or Coverage Enhanced downlink, BL/CE DL, subframe+1 absolute subframe+N_bundle *N_(R_PUCCH) on BL/CE UL subframe+1 absolute subframe+1 BL/CE DL subframe, or
D2=1 absolute subframe+N_bundle*N_(R_PUCCH) on BL/CE UL subframe+1 absolute subframe+2 BL/CE DL subframes;
wherein D1 is the scheduling delay for a first HARQ process being subject to the crossing schedule, D2 is the scheduling delay for HARQ processes following the first HARQ process, the absolute subframe refers to any type of subframe, N_bundle refers to a number of bundles of PUCCH, and N_(R_PUCCH) refers to a number of PUCCH repetition.

18. The method of claim 10, wherein in response to a presence of invalid downlink subframes, invalid uplink subframes and measurement gap, sending the delay indicator to inform the UE of the scheduling delay, D0 or D1 or D2, as follows:
D0=2 Bandwidth-reduced Low-Complexity or Coverage Enhanced downlink, BL/CE DL, subframes no overlapping measurement gaps;
D1=1 downlink valid subframe no overlapping any of the measurement gaps+1 absolute subframe unless it overlaps any of the measurement gaps+(N_bundle*N_(R_PUCCH) on BL/CE UL subframes no overlapping any of the measurement gaps as well as 1 absolute subframe in case it is preceded by any of the measurement gaps)+1 absolute subframe including overlapping measurement gaps+1 BL/CE DL subframe no overlapping any of the measurement gaps; or
D2=1 absolute subframe unless it overlaps any of the measurement gaps+ (N_bundle*N_(R_PUCCH) on BL/CE UL subframes no overlapping any of the measurement gaps+1 absolute subframe in case it is preceded by any of the measurement gaps)+1 absolute subframe including overlapping any of the measurement gaps+2 BL/CE DL subframes no overlapping measurement gaps,
wherein D0 is the scheduling delay for a HARQ process being not subject to the crossing schedule, D1 is the scheduling delay for a first HARQ process being subject to the crossing schedule, D2 is the scheduling delay for HARQ processes following the first HARQ process, the absolute subframe refers to any type of subframe, N_bundle refers to a number of bundles of PUCCH, and N_(R_PUCCH) refers to a number of PUCCH repetition.

19. A user equipment, UE, in a communication network, the UE comprising:
a processor; and
a memory communicatively coupled to the processor and adapted to store instructions which, when executed by the processor, cause the network node to perform operations of the method of claim 1.

20. A network node in a communication network, the network node comprising:
a processor; and
a memory communicatively coupled to the processor and adapted to store instructions which, when executed by the processor, cause the network node to perform operations of the method of claim 10.

21. A computer program product comprising a non-transitory computer readable storage medium storing instruction that, when executed by at least one processor of a computing system, cause a computing system to perform the method of claim 1.

* * * * *